(12) United States Patent
Bernhard

(10) Patent No.: US 6,203,038 B1
(45) Date of Patent: Mar. 20, 2001

(54) VEHICLE STEERING MECHANISM

(75) Inventor: Ernst Bernhard, Aegerten (CH)

(73) Assignee: Wandfluh Automotive AG, Kandergrund (CH)

( * ) Notice: Subject to any disclaimer, the term of this patent is extended or adjusted under 35 U.S.C. 154(b) by 0 days.

(21) Appl. No.: 09/186,627

(22) Filed: Nov. 6, 1998

(30) Foreign Application Priority Data

Nov. 7, 1997 (EP) .................................................. 97810839

(51) Int. Cl.$^7$ ........................................................ B62D 7/09
(52) U.S. Cl. ............................ 280/93.502; 280/93.511; 74/496
(58) Field of Search ............................. 280/93.512, 89.1, 280/771, 124.125, 89.11, 90, 124.134, 93.502, 93.51, 93.511; 172/15; 180/400, 414, 415, 58, 446; 414/686; 477/86; 74/496

(56) References Cited

U.S. PATENT DOCUMENTS

| | | | |
|---|---|---|---|
| 1,782,361 | * 11/1930 | Matschei . | |
| 2,428,651 | * 10/1947 | Buese | 280/96.1 |
| 2,862,723 | * 12/1958 | Peras | 280/96.1 |
| 4,635,952 | * 1/1987 | Smith | 280/96.1 |
| 4,690,418 | * 9/1987 | Smith | 280/96.1 |
| 4,899,611 | * 2/1990 | Pinna | 74/492 |
| 4,921,470 | * 5/1990 | Kotani et al. | 464/151 |
| 4,938,094 | * 7/1990 | Cochard | 74/552 |
| 5,080,520 | * 1/1992 | Wood, Jr. | 403/77 |
| 5,340,137 | * 8/1994 | Carraro et al. | 280/96.1 |
| 5,358,445 | * 10/1994 | Wuebker | 464/112 |
| 5,503,239 | | 4/1996 | Shimizu | 180/79 |
| 5,687,811 | * 11/1997 | Shimizu | 180/447 |
| 5,709,399 | * 1/1998 | Smith, Jr. | 280/96.1 |
| 5,722,784 | * 3/1998 | Link | 403/158 |
| 5,836,211 | * 11/1998 | Ross et al. | 74/493 |
| 5,930,908 | * 8/1999 | Patrisso et al. | 33/600 |
| 6,062,762 | * 5/2000 | Lustig | 403/270 |

FOREIGN PATENT DOCUMENTS

| | | |
|---|---|---|
| 195 19 588 | 4/1996 | (DE) . |
| 0008305 | 3/1980 | (EP) . |
| 0737612 | 10/1996 | (EP) . |

* cited by examiner

*Primary Examiner*—J. J. Swann
*Assistant Examiner*—J. Allen Shriver

(57) ABSTRACT

The present invention relates to a vehicle steering mechanism having a variable transmission ratio, and a steering gear designed for such a steering mechanism.

22 Claims, 9 Drawing Sheets

VEHICLE STEERING MECHANISM

PRIOR ART

Figure 1:
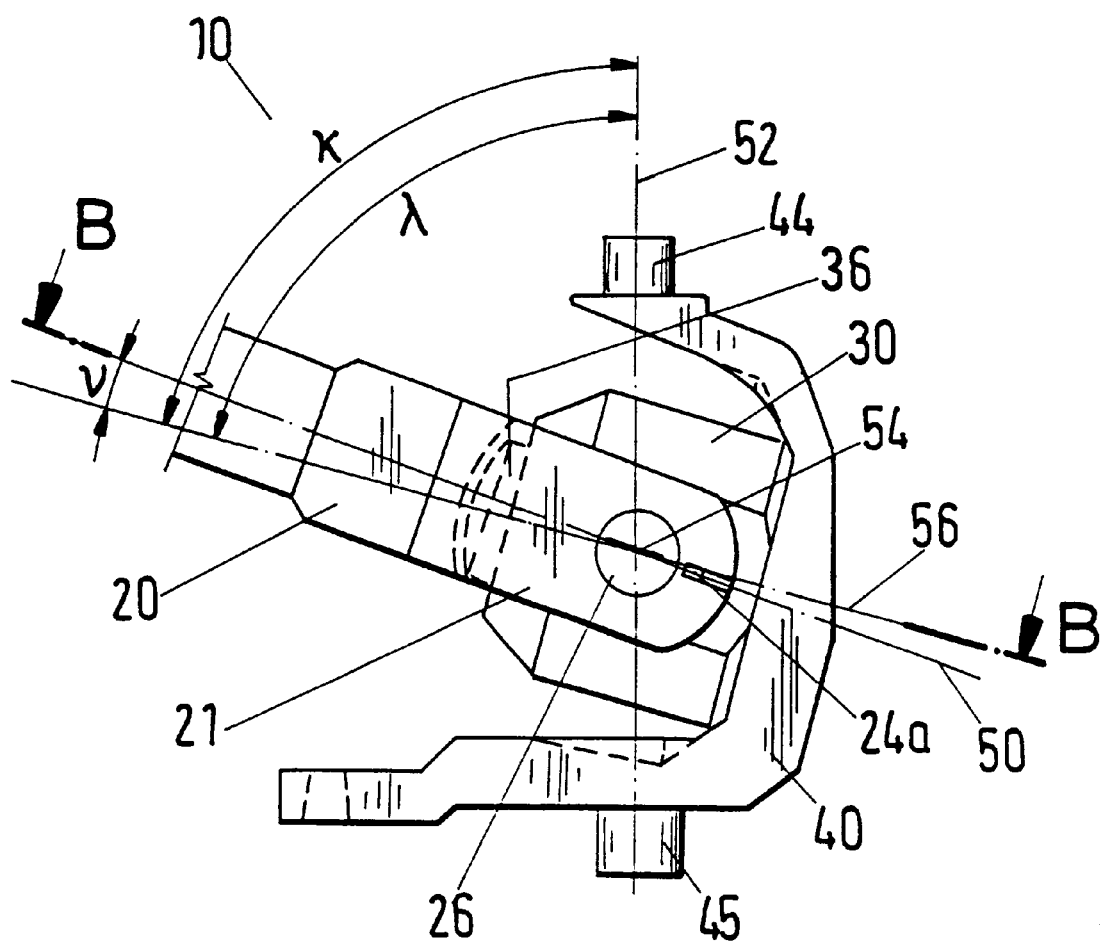

The invention relates to a vehicle steering mechanism (device used in steering a vehicle) of the type that allows the ratio of transmission between the controlling movement of a steering control device and the controlled movement of the components of the vehicle which are steered by the steering mechanism to be varied, with the variability of the transmission ratio being generated principally via the steering gear. A steering gear of this type encompasses a drive component and an output component, and translates movement of the drive component into movement of the output component, with the ratio of transmission being variable. The drive component of the steering gear is connected to the steering control device, wherein the ratio of transmission between the movement of the steering control device and that of the drive component remains basically constant. The output component of the steering mechanism is connected to the steered components of the vehicle, wherein, again, the ratio of transmission between the movement of the output component and that of the steered components of the vehicle remains basically constant.

The term "vehicle" will hereinafter be used to refer generally to any vehicle (land-based vehicle, watercraft, aircraft, space vehicle); however, for purposes of illustration, the most common example, that of an automobile, will be used to illustrate the steering mechanism and steering gear specified in the invention, as well those known-in-the-art assemblies assemblies. In a land-based vehicle, the steering control device is normally comprised of a assemblies wheel, and the components of the vehicle steered by it comprise the wheels of the vehicle. In the case of a boat, the steering control device and the components steered by it may be comprised of a steering wheel or rudder, and in the case of an aircraft, they may be comprised of a control stick or rudder unit.

When used in an automobile steering mechanism, the drive component of the steering gear—normally in the form of a steering shaft—is connected to a steering wheel. The output component of the steering gear is connected to the steered wheels of the vehicle, usually the front wheels, via a steering linkage. The steering linkage normally comprises tie rods, connecting rods, a steering arm, and/or other components. In the case of a rack-and-pinion steering mechanism, the steering gear is comprised of a pinion-steering rack mechanism, with the steering rack, which forms the output component of the steering gear, being connected to the steering linkage. In the case of a cam-and-roller steering mechanism and/or a ball-and-nut-type power steering mechanism, the output component of the steering gear is formed by a so-called steering roller shaft, to which a steering arm, which controls the steering linkage, is connected.

In the case of a land-based vehicle having a steering wheel and steered wheels, the angle of the steering wheel is designated as a and that of the steered wheels is designated as $\beta$. Then, the steering mechanism of the vehicle generally translates a rotation of the steering wheel by an angle of rotation $d\alpha$ into a rotational movement of the steered wheels by a steering angle $d\beta$. In most commonly used steering mechanism, the transmission ratio between the rotational movement of the steering wheel and that of the steered wheels remains basically constant over the entire steering range from one steering stop of the steering mechanism to the other steering stop, in other words, there is a linear relationship between the angle of rotation $d\alpha$ of the steering wheel and the steering angle $d\beta$ of the steered wheels.

In terms of operation of the vehicle, however, a variable ratio of transmission between the rotation of the steering wheel and the rotation of the steered wheels is generally desirable. In addition, the requirements as to the characteristic curve of this transmission ratio may differ greatly depending upon the type of vehicle and/or the driving conditions. For example, for secure control of the vehicle at high speeds, in which the steering assembly is operated principally within a narrow range around the straight-ahead position, a high transmission ratio $d\alpha/d\beta$ (ratio between the angle of rotation $d\alpha$ of the steering wheel and the steering angle $d\beta$ of the steered wheels) is desirable, in order that slight movements of the steering wheel do not result in an abrupt change in direction. However, when the vehicle is being maneuvered at low speeds, especially during parking, a low transmission ratio $d\alpha/d\beta$ is desirable, in order that the steered wheels may be rapidly turned from one steering stop to the other steering stop.

When the transmission ratio $d\alpha/\beta$, (ratio between the angle of rotation $d\alpha$ of the steering wheel and the steering angle $d\beta$ of the steered wheels) of a neutral steering position for travel straight ahead decreases with rotation of the steering wheel to the right or left up to the steering stop, this is referred to as a progressive steering mechanism. With a progressive steering mechanism (that is, a steering mechanism for which the transmission ratio has a progressive characteristic curve) a rotation of the steering wheel around a certain angular increment $d\alpha$ when the wheels are already turned thus effects a greater rotation $d\beta$ of the steered wheels than when the wheels are in a straight position. A progressive steering mechanism is particularly advantageous for racing cars, as it enables precision steering on the straightaway at high speeds, while permitting rapid adjustments to the steering angle of the steered wheels should the vehicle go into a skid, thus permitting the car to pull out of the skid.

In contrast, one may speak of a degressive steering mechanism (that is, a steering mechanism whose transmission ratio has a degressive characteristic curve) when the transmission ratio $d\alpha/d\beta$ (ratio between the angle of rotation $d\alpha$ of the steering wheel and the steering angle $d\beta$ of the steered wheels) of a neutral steering position for driving straight ahead increases with the rotation of the steering wheel to the right or left up to the steering stop. In the case of a degressive steering mechanism, a rotation of the steering wheel around a certain angular increment $d\alpha$ when the wheels are turned out of the straight-ahead position effects a lesser rotation $d\beta$ of the steered wheels than when the wheels are in a straight-ahead position. A degressive steering assembly may be used, for example, in cases in which it is desirable to omit a power or power-assisted support of the steering mechanism, while enabling the steering of heavy-duty vehicles at low speeds. In this case, a degressive steering assembly facilitates maneuvering, for example, during parking at low speeds, in that it operates more smoothly when the wheels are turned very far than when they are in the straight-ahead range.

One vehicle steering mechanism having a variable transmission ratio is offered, for example, by the firm "ZF Friedrichshafen AG" of Germany, in the form of a rack-and-pinion steering assembly having either a degressive or a progressive characteristic curve. The degressivity or progressivity of this steering mechanism is based upon a steering rack the toothing of which is manufactured using a different module and pressure angle. The difference between the largest and the smallest transmission of the steering rack amounts to a maximum of approximately 30%.

From DE 195 19 588 A1 (Honda) a steering gear having a progressive characteristic curve is known in the art. The variability of the transmission ratio in this steering gear is based upon the fact that the output shaft of the steering gear extends parallel to its input shaft, but offset from it somewhat (that is, eccentrically). To couple the input shaft with the output shaft, a connecting component is positioned between the two shafts, which performs the basic function of a thrust crank (rectilinear sliding pair combined with a hinge), transmitting the torque from the input shaft, or from an extension piece that is firmly mounted to the input shaft such that it cannot rotate, to the output shaft. One major problem with a steering gear of this type is that it cannot be made free from play without requiring enormous constructive expenditure.

In the publication EP 0 008 305 A (BMW), a steering gear based upon a universal joint is described, which makes use of the gimbal error of the universal joint in order to achieve a variable transmission ratio. Due to the bending angle of the universal joint, which is limited to approximately 40 degrees, the maximum variability of the transmission ratio that can be achieved is approximately 30%.

In EP 0 737 612 A (Caterpillar) a control gear for operating a control valve is described, which controls one or more hydraulic cylinders used for steering an articulated vehicle. The control gear comprises a telescopic shaft, at the two ends of which universal joints are mounted such that the gimbal errors of the two universal joints are not canceled out, but are intensified. Due to the play that is created by the two universal joints, a control gear of this type is poorly suited as an actual steering gear, since it cannot be manufactured to be free from play.

Additionally, there are some known-in-the-art steering gears having variable transmission ratios for which the variability of the transmission ratio is produced using elliptical toothed gears.

However, all of the prior steering gears and/or steering mechanisms having variable transmission ratios, in comparison with traditional steering gears having basically constant transmission ratios, possess system-specific drawbacks that up to now have prevented their widespread use.

Due to the limited minimum transmission ratio, most known-in-the-art steering gears having a variable transmission ratio require an additional reducing gear, in order to achieve the transmission ratio $d\alpha/d\beta$ (ratio between the angle of rotation $d\alpha$ of the steering wheel and the steering angle $d\beta$ of the steered wheels) that is normally required for vehicle steering assemblies. This causes problems in terms of the level of mechanical rigidity of the power transmitting elements that can be achieved, and in terms of the adjustability of the play in the steering mechanisms. In addition, special and costly tooling lay-outs are required for the manufacture of elliptical toothed gears and for the manufacture of steering racks having variable modules and pressure angles, if the necessary manufacturing precision is to be achieved.

PRESENTATION OF THE INVENTION

The object of the present invention is to provide a steering mechanism having a variable transmission ratio, which can be controlled over the entire steering range basically without play, is simple in its construction, and permits a transmission ratio that is suitable for vehicle steering mechanisms.

The attainment of this object is the object of the independent patent claims 1 and 4.

In accordance with the invention, a vehicle steering mechanism having a variable transmission ratio has a steering gear comprised of a drive component that rotates around a first rotational axis, and is coupled, via a connecting component, to an output component that rotates around a second rotational axis, wherein the drive component is mounted to the connecting component such that the drive component can pivot around a third rotational axis, while the connecting component is mounted to the output component such that the connecting component can pivot around a fourth rotational axis. The drive component, the connecting component, the output component, and the four rotational axes are positioned such that the four rotational axes intersect at a single point, and the minimum angle formed between the first rotational axis and the fourth rotational axis ranges from 0.1 degree to 40 degrees.

A steering gear for a vehicle steering mechanism having a variable transmission ratio, as specified in the invention, is comprised of a drive component that rotates around a first rotational axis and is coupled, via a connecting component, with an output component that rotates around a second rotational axis, wherein the drive component is mounted to the connecting component such that the drive component can pivot around a third rotational axis, and the connecting component is mounted to the output component such that the connecting component can pivot around a fourth rotational axis. The drive component, the connecting component, the output component, and the four rotational axes are positioned such that the four rotational axes intersect at a single point, and the minimum angle formed between the first rotational axis and the fourth rotational axis ranges from 0.1 degree to 40 degrees.

The angle formed between two axes (or rotational axes) is understood to refer, as is generally customary, to the angle measuring between zero and ninety degrees that lies between two linear axes (or rotational axes) that intersect at a single point.

In a steering gear as specified in the invention, the ratio of transmission between the rotational movement of the drive component and the consequent rotational movement of the output component (as with a universal joint) varies as a function of the angle of the drive component. Based upon the relative position in relation to the neutral, straight-ahead position, in which the steering gear is mounted in the steering mechanism, a progressive or a degressive steering assembly can be created using the steering gear specified in the invention. The transmission ratio is determined principally by the relative angular position of the gear and by the angle formed by the first rotational axis and the fourth rotational axis, which itself varies as a function of the relative angular position of the gear. In accordance with the invention, the drive component, the connecting component, the output component, and the four rotational axes are positioned such that during operation of the steering gear, over the entire usable steering range, the minimum value of the angle formed by the first and fourth rotational axes ranges from 0.1 degree to 40 degrees. Preferably, the configuration is such that this angle ranges from 30 degrees to 0.1 degree. In an especially preferred configuration this angle measures approximately 5 degrees. This permits a considerably lower minimum transmission ratio than is possible with known-in-the-art gears mechanisms, so that the use of an additional reducing gear for a vehicle steering mechanism can be omitted.

The steering gear specified in the invention is comprised basically of only the three parts: drive component, connecting component, the output component, along with first joint components designed to couple the drive component to the connecting component such that the drive component can pivot, and second joint components designed to couple the connecting component to the output component such that the connecting component can pivot. The steering gear specified in the invention is thus extremely simple in its construction. All the joint components required for the steering gear specified in the invention can be adjustable bearings, such as tapered roller bearings, so that the steering gear specified in the invention can be controlled over the entire steering range, basically without play.

In one preferred embodiment of the steering mechanism specified in the invention, the drive component and the output component are positioned relative to one another such that the angle formed between the first rotational axis and the second rotational axis ranges from 50 degrees to 89.9 degrees. Preferably, the configuration is such that this angle ranges from 60 degrees to 89.9 degrees. And especially preferred is a configuration in which this angle measures approximately 70 degrees.

Another preferred embodiment of the steering mechanism specified in the invention comprises, for operation of the steering mechanism, a steering wheel, which is equipped with rotational angle limit stops designed to limit the rotational movement of the steering wheel. The rotational angle limit stops may comprise, for example, a cam that is mounted in a fixed position to the steering wheel and that operates in conjunction with a cam stop, attached to the steering wheel mount, to limit rotational movement to the right and the left. This embodiment of the invention proves particularly advantageous for use with power-assisted steering mechanism (power steering). With traditional power steering mechanism mechanisms, the maximum steering angle is limited by the steering stop of the steered wheels, while a hydraulic rotary valve designed to control the power system is typically controlled by the gear input shaft, which is mounted on the steering gear on the side of the steering wheel. This creates the risk of an overload of the hydraulic device in the power steering mechanism if, for example, during parking the steering wheel is turned beyond the point at which the wheels are at the point of the limit stop. With the possibility of limiting the angle of rotation at the steering wheel, this risk of overloading the power mechanism can be prevented using the steering mechanism specified in the invention. As with traditional power steering mechanisms for automobiles, an automobile power steering mechanism as specified in the invention can also be operated manually in the case of a failure of the power system.

A further preferred embodiment of the steering gear specified in the invention is characterized by the fact that the connecting component is positioned in relation to the output component such that the angle formed between the fourth rotational axis and the second rotational axis ranges from 25 to 85 degrees, preferably 70 to 80 degrees. Particularly preferable is an arrangement in which this angle measures approximately 75 degrees. In this embodiment of the steering gear specified in the invention, there is a range of angle positions (phases) for the gear, in which a rotation of the drive component around a 180-degree angle (with the phase as center) is coupled with a rotation of the output component around an angle that measures less than 180 degrees. This range is defined as the long-phase range of the drive component or the short-phase range of the output component. The rotation of the drive component around the other 180-degree angle is then coupled with a rotation of the output component around an angle that measures greater than 180 degrees, since, naturally, the rotation of the drive component in a full circle, as before, is coupled with the rotation of the output component in a full circle. When a steering gear in accordance with this embodiment is used in an automobile steering mechanism, the steering gear is advantageously mounted such that when the steered wheels are in a straight forward position, the drive component lies at the center of its long-phase range, and the output component lies at the center of its short-phase range. Thus it is achieved that, with a preset range of steering angles, within the boundaries of which the angle β of the steered wheels can be varied, the usable range of rotational angles, within the boundaries of which the angle a of the steering wheel can be varied, is maximized.

Preferably, a steering gear of the type described above, in accordance with the invention, includes a means for selectively adjusting the angle enclosed between the fourth rotational axis and the second rotational axis.

In a further variation on the steering gear specified in the invention, the drive component is positioned in relation to the connecting component such that the first rotational axis forms an angle with the third rotational axis that ranges from 45 degrees to 90 degrees. Preferably, this angle measures approximately 90 degrees.

The drive component preferably comprises one bifurcated section (with a shape that resembles a bicycle fork) having two fork shafts (fork blades), wherein each of the two fork blades is equipped with first joint pieces which enable the fork blades to be coupled with the connecting component such that they can pivot. These first joint pieces may comprise journals which can be attached to the fork blades via screws, and which operate in conjunction with bearing bushings and tapered roller bearings mounted on the connecting component. With the journals which can be attached via screws, the play in the tapered roller bearings can be adjusted. In addition, each of the fork blades can be equipped with a groove that extends along the lengthwise axis of the blade and is equipped with a boring that extends crosswise through the groove, into which a mounting screw can be inserted, in order to secure the journal.

Other suitable types of joints may also be used to couple the drive component to the connecting component such that the drive component can pivot around the third rotational axis. For example, the bushings may be mounted on the drive component and the journals on the connecting component.

In one preferred embodiment of the steering gear specified in the invention, in order to couple the connecting component and the output component such that the connecting component can pivot, a journal is fastened with its one side to one component of a pair of components comprising the connecting component and the output component, and the other component of the two of this pair of components is mounted, via bearings, on the journal such that it can rotate. In other words, either the journal is fastened with its one side to the output component and the connecting component is mounted on the journal, or the journal is fastened with its one side to the connecting component and the output component is mounted on the journal. Thus, the journal, in combination with the bearings, forms the second joint component for connecting the connecting component to the output component such that it allows pivoting around the fourth rotational axis. In this case, the fourth rotational axis is defined by the center of the journal. One advantage of the single-sided mounting of the journal is the great freedom of movement afforded the steering gear. For example, the free (floating) end of the journal, opposite the end which is firmly fixed to the output component, requires no bearing and/or means of support mounted to the connecting component, which could impede the movement of the steering gear, in contrast, for example, to a construction of the type used with the traditional universal joint.

The journal is preferably provided with a conical section, the bearings comprise one or more tapered roller bearings, and the component that is mounted to the spindle can be held in its axial position via mounting elements that can be shifted axially, wherein the play allowed in the mounting elements (and thus in the second joint component) can be adjusted via an axial shifting of the mounting elements. The mounting elements may comprise a nut that is equipped with internal screw threads, which can be screwed onto the free end of the journal, which is equipped with external screw threads, in order to fix the component that is mounted to the journal in its axial position.

The output component preferably is comprised of a first leg piece, a second leg piece, and a bridge piece that connects the two leg pieces, wherein the journal is fixed with its one side on the bridge piece, and each of the two leg pieces is equipped with third joint components used to mount the output component such that it can rotate around the second rotational axis. These third joint components may comprise journals that are firmly fixed to the output component, such that they operate in conjunction with bearing bushings which are fastened, for example, to the carrier linkage of a vehicle. The third joint components also preferably comprise tapered roller bearings that may be mounted such that they allow no play.

Other suitable joint components may, however, also be used to couple the connecting component to the output component such that the connecting component can pivot around the fourth rotational axis. For example, the output component may be connected to only one side of the carrier linkage of a vehicle.

Other forms besides the above-described sickle-shaped form (that is, two leg pieces that are connected by a bridge piece) are also possible for the output component. The output component may, for example, be angular in design, having a first leg piece and a second leg piece that is mounted to the first leg piece at an angle. With an angular output component, a journal, used to mount the connecting component to the output component such that the connecting component can pivot, can be fixed to one side of the first leg piece, and the second leg piece can be equipped with joint components that will allow the output component to be mounted such that it can pivot around the second rotational axis.

A further variation of the steering mechanism specified in the invention is characterized by the fact that the angle formed between the first rotational axis and the second rotational axis can be adjusted by varying the position of the drive component in relation to the position of the output component. In this manner, the function by which the transmission ratio varies, dependent upon the rotational angle of the drive component, can be changed. Preferably, the angle that is formed between the first rotational axis and the second rotational axis can be infinitely varied. This permits variation in the progressivity of the steering mechanism. In a further preferred embodiment of the invention, this angle can be varied as a function of the driving speed, thus creating a speed-dependent progressivity of the steering mechanism.

In another variation of the invention, the fourth rotational axis and the second rotational axis form an angle that deviates from 90 degrees, and the angle formed between the first rotational axis and the second rotational axis is variable. With this variation of the invention, the angle between the first rotational axis and the second rotational axis can be set at an initial value, at which a rotation of the drive component is always coupled with a rotation of the output component in the same direction, and at a second value, at which, within a certain range of rotational angle settings for the drive component, a rotation of the drive component is coupled with a rotation of the output component in an opposite direction. This variation on the invention may be used, for example, to facilitate the reverse driving of a vehicle, since in reverse driving there is a coupling in an opposite direction between the rotational movement of the steering wheel and the steering movement of the steered wheels. Further, this embodiment of the invention can be used with a four-wheel steering mechanism, in order, for example, to permit the opposite turning of the front and rear wheels at low speeds, and a turning in the same direction at high speeds.

The following detailed description of preferred exemplary embodiments of the present invention, in combination with the attached diagrams, serves only as an example to provide a better understanding of the invention, and is not intended to limit the scope of protection of the present invention as it is defined in the patent claims. To the expert, additional advantageous embodiments and combinations of features can be drawn from the following description, in combination with the attached diagrams and the entirety of the patent claims, without being specifically outlined, but these still remain within the scope of the present invention.

BRIEF DESCRIPTION OF THE DIAGRAMS

Figure 2:
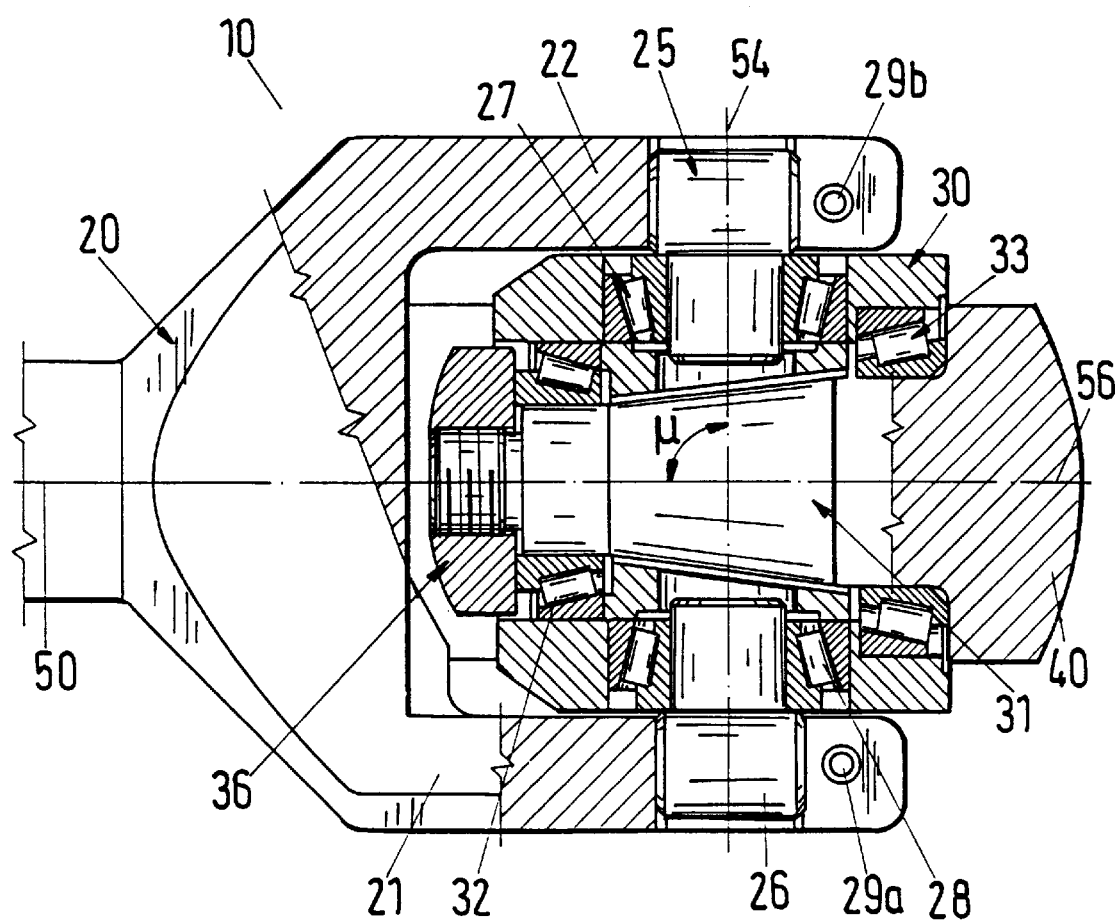
Figure 3:
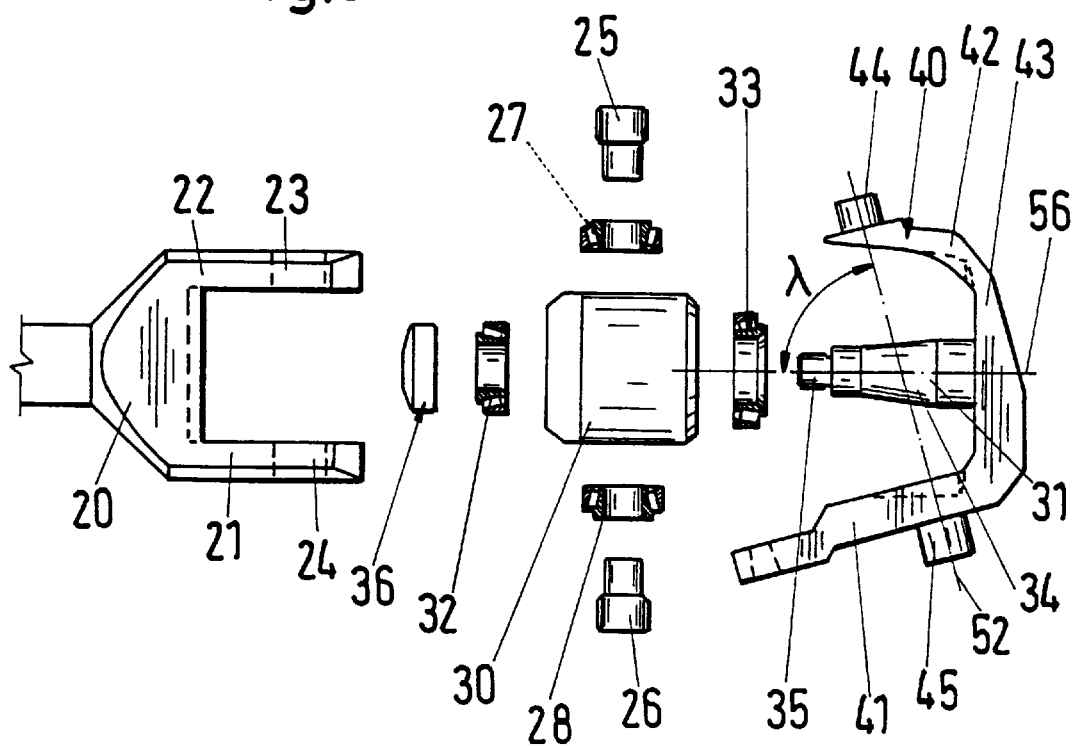
Figure 4:
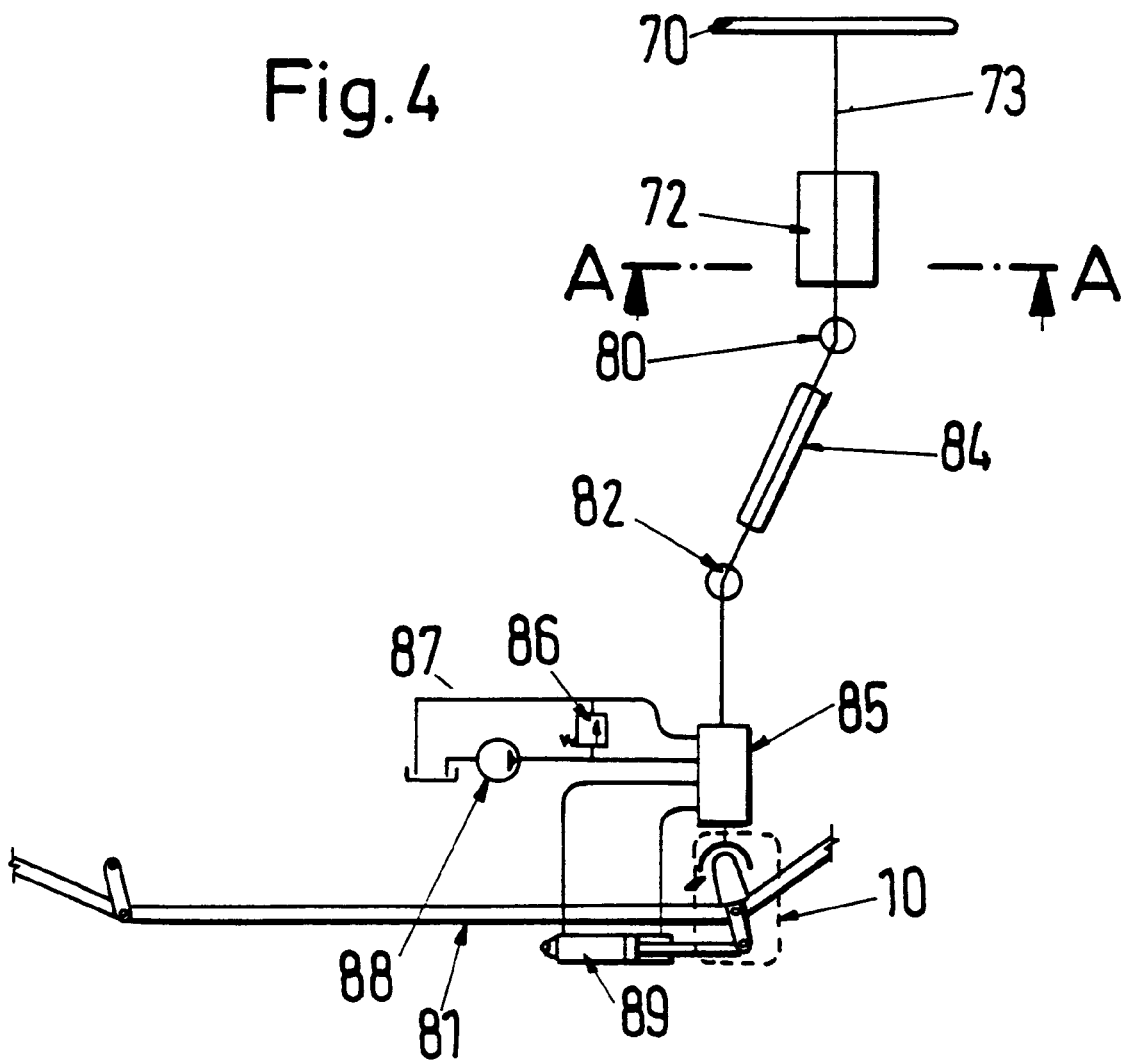
Figure 5:
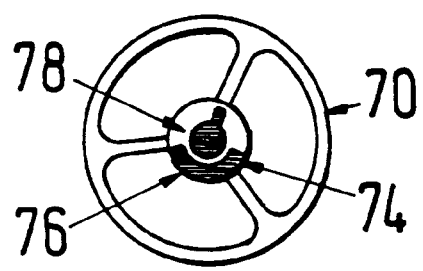
Figure 6:
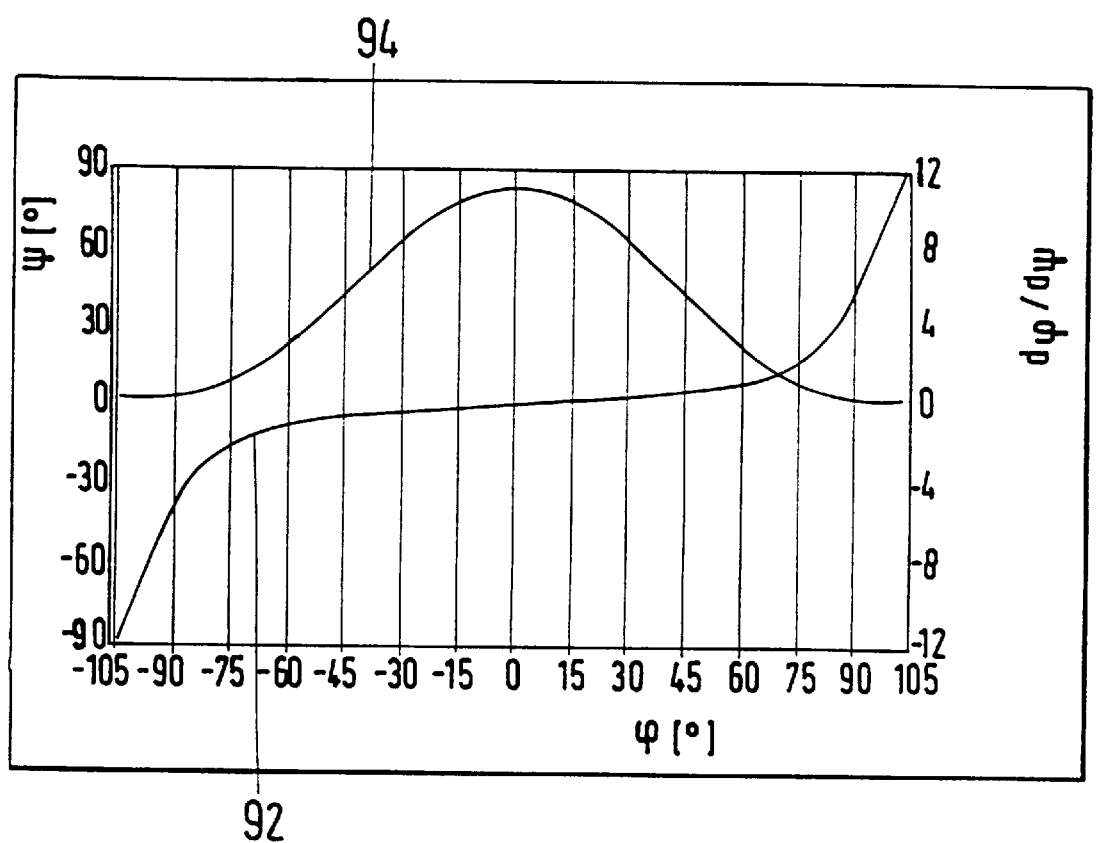
Figure 7:
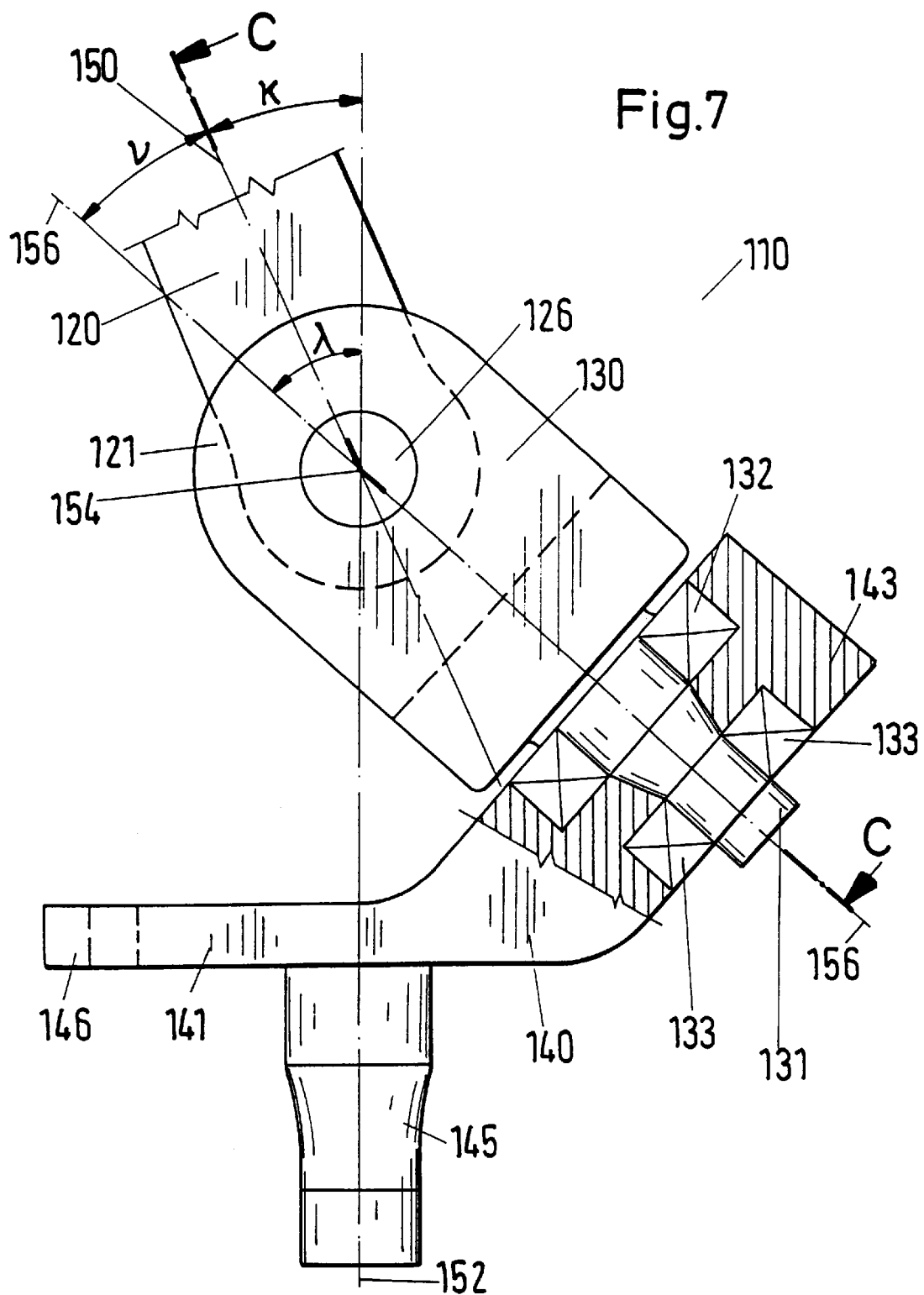
Figure 8:
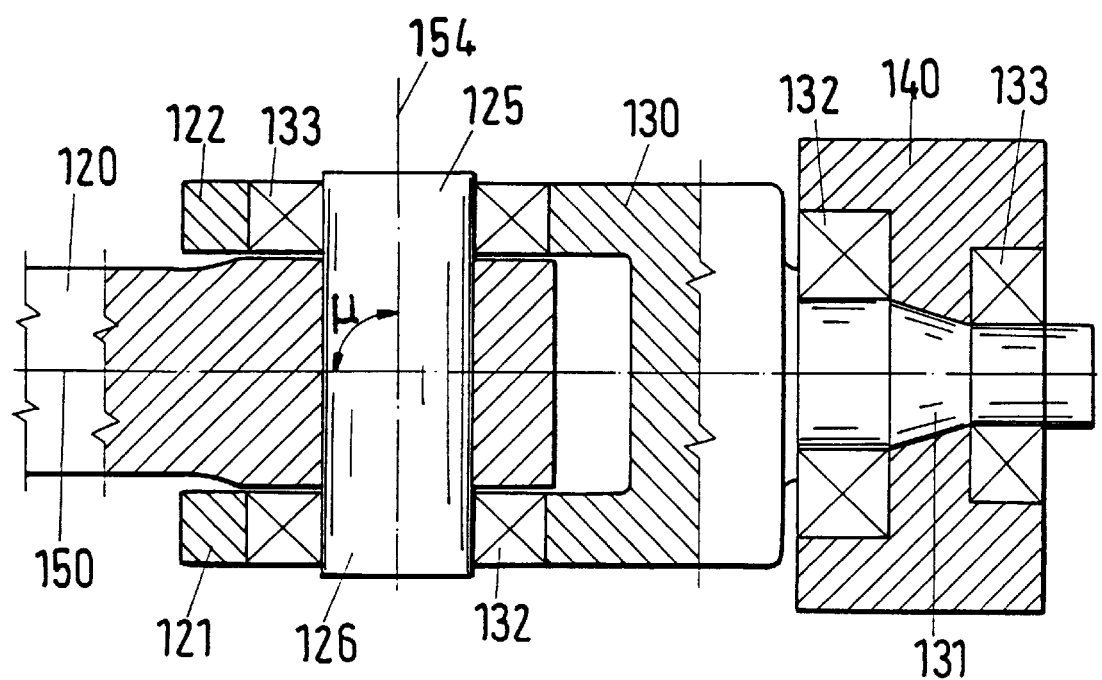
Figure 9:
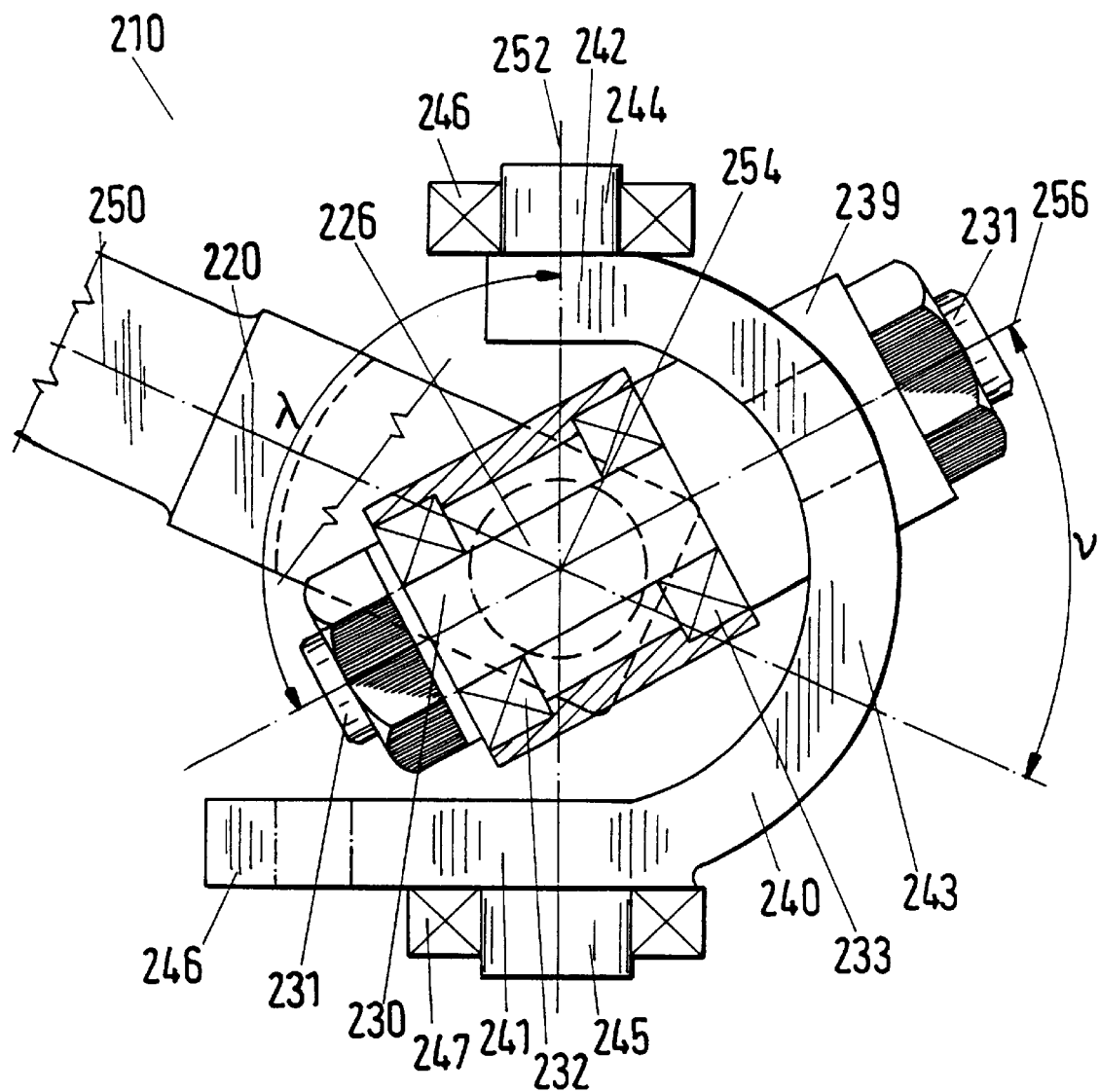
Figure 10:
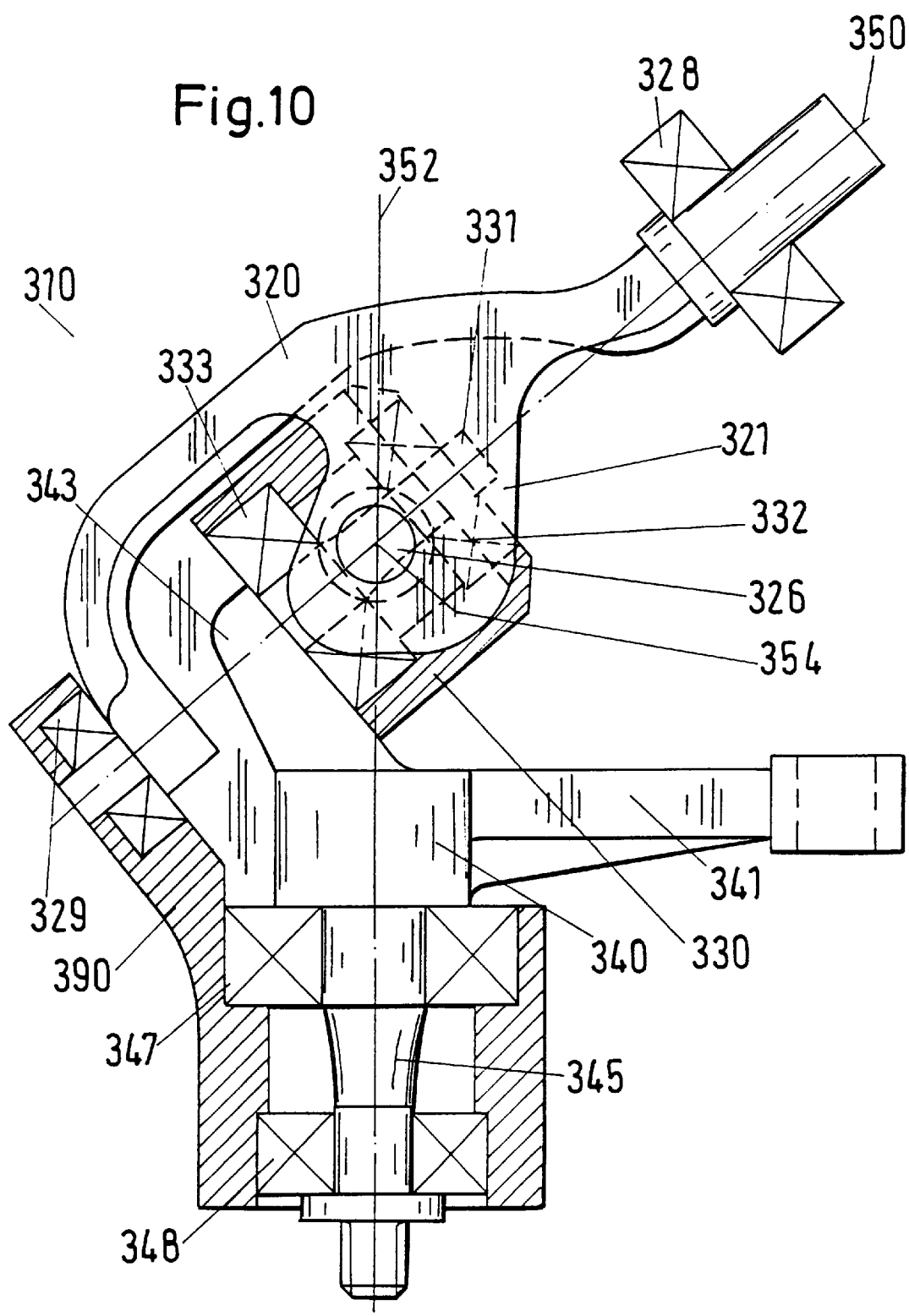
Figure 1:
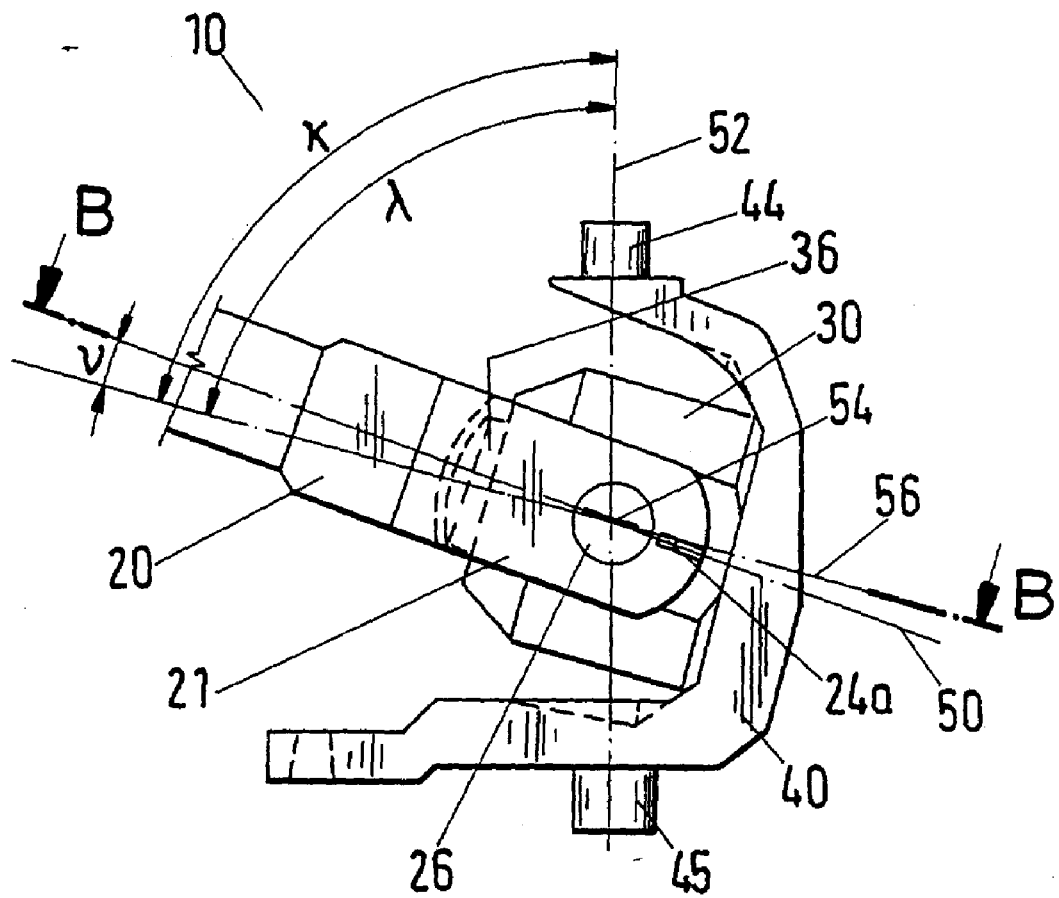
Figure 1:
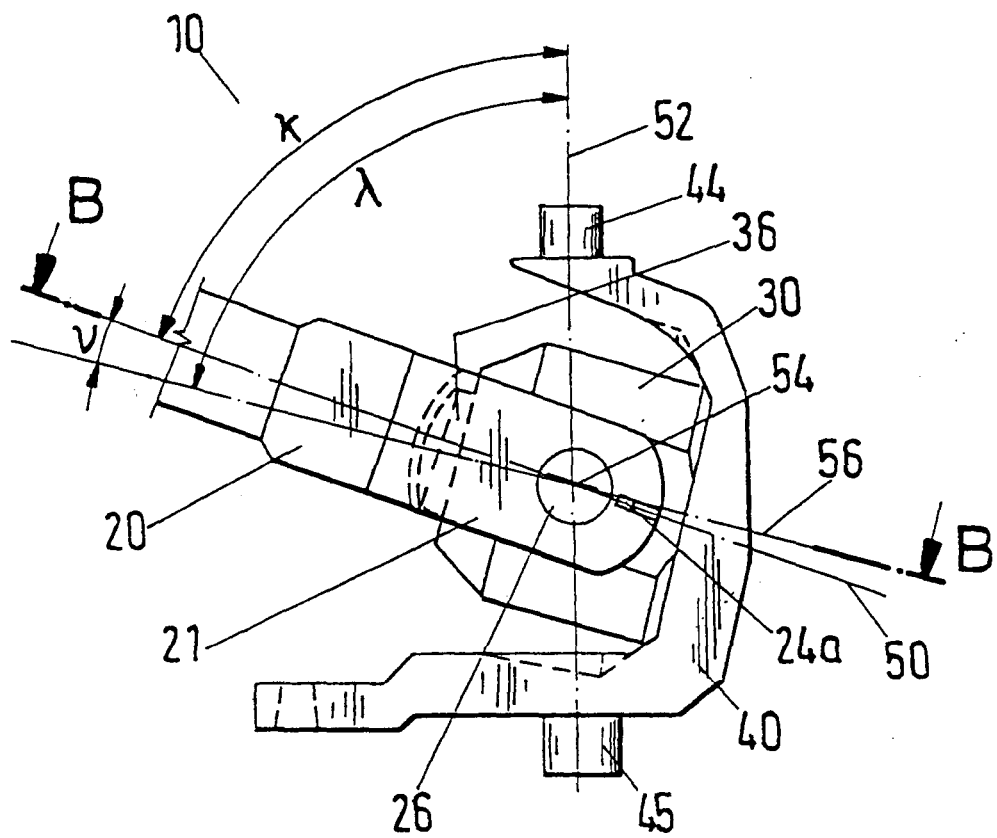
Figure 10:
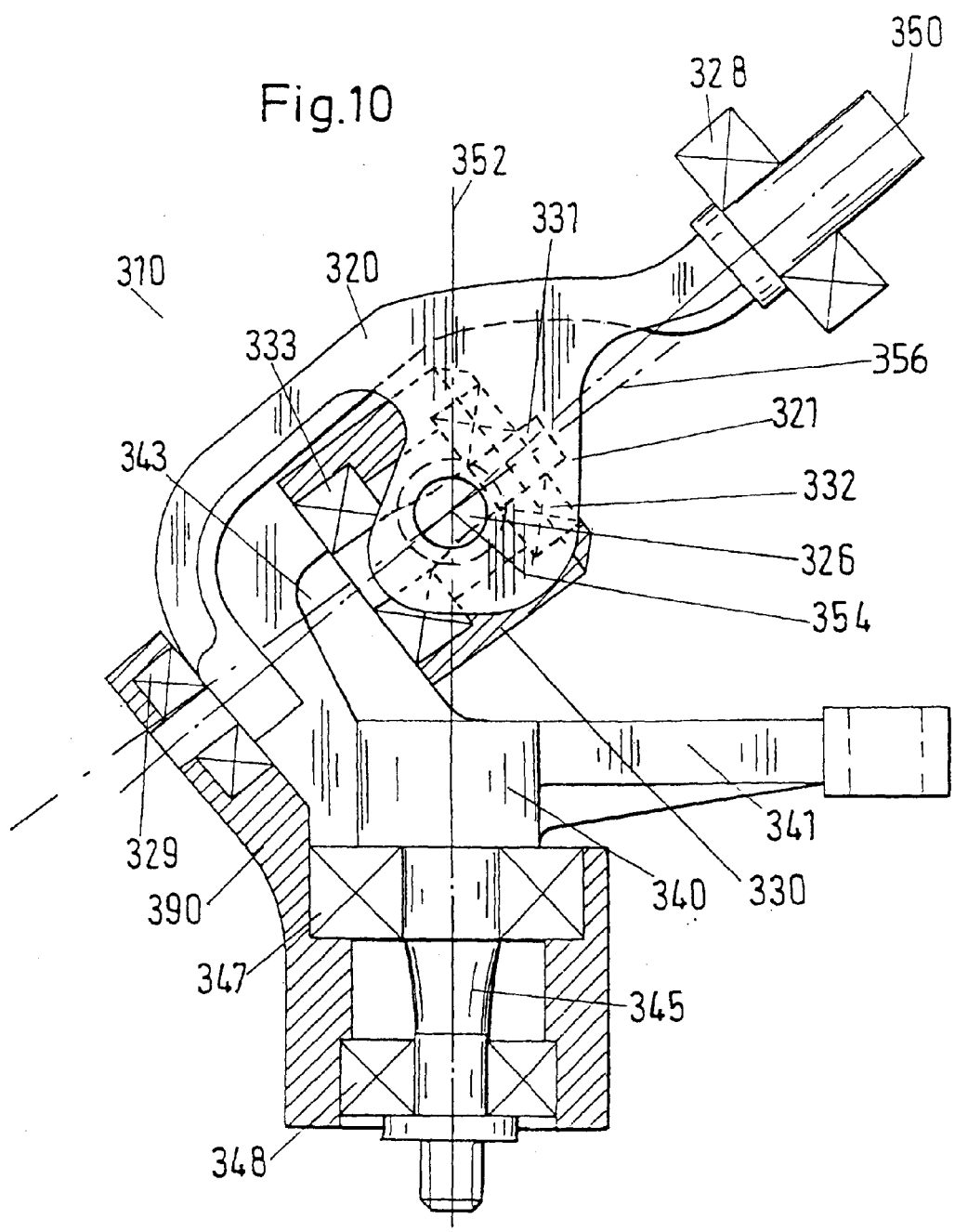

The diagrams illustrate preferred embodiments of the present invention. These show:

FIG. 1 a side view of a steering gear in accordance with a first preferred embodiment of the invention;

FIG. 2 a cross-section, along the line B—B, of the steering gear shown in FIG. 1;

FIG. 3 a detached diagram of the steering gear in FIG. 1;

FIG. 4 a schematic representation of a power-assisted steering mechanism in accordance with a preferred embodiment of the invention;

FIG. 5 a partially sectional illustration along the line A—A of the steering mechanism in FIG. 4 [sic];

FIG. 6 a graphic representation of the kinematics and the transmission ratio of the steering gear illustrated in FIGS. 1 through 3;

FIG. 7 a steering gear in accordance with a second preferred embodiment of the invention in a simplified, partially sectional side view;

FIG. 8 a cross-section, along the line C—C, of the steering gear shown in FIG. 7;

FIG. 9 a steering gear in accordance with a third preferred embodiment of the invention in a simplified, partially sectional side view;

FIG. 10 a steering gear in accordance with a fourth preferred embodiment of the invention in a simplified, partially sectional side view.

In the diagrams, similar components are provided with similar designators.

EMBODIMENTS OF THE INVENTION

In FIG. 1, an exemplary embodiment of a steering gear 10 for a steering mechanism in accordance with the invention is shown, in a side view. In FIG. 2, a cross-section of this steering gear 10, along the dotted-dashed line B—B (that is, through the first rotational axis 50 and the fourth rotational axis 56), is shown, and FIG. 3 shows a detached illustration of the steering gear 10.

The steering gear 10 illustrated in FIGS. 1 through 3 has a drive component 20 that rotates around a first rotational axis 50 and that is coupled, via a connecting component 30, to an output component 40 that rotates around a second rotational axis 52. The drive component 20 is linked to the connecting component 30 such that the drive component can pivot around a third rotational axis 54. The connecting component 30 is then linked to the output component 40 such that the connecting component can pivot around a fourth rotational axis 56.

The drive component 20 comprises a bifurcated piece which, like a bicycle fork, comprises two fork shafts (fork blades) 21, 22. Each of the two fork blades 21, 22 is equipped with a boring 23, 24 that is provided with internal screw threads. Into each of these borings 23, 24, a journal 25, 26 that is equipped with external screw threads can be screwed. Each of the journals 25, 26 has an outer, thicker section that is equipped with external screw threads which fit the internal screw threads in the borings 23, 24, and an inner, narrower section, which protrudes on the inner side of the drive component 20 beyond the inner side of the fork blades 21, 22. The inside sections of the journals 25, 26 are mounted in first tapered roller bearings 27, 28 that fit into corresponding borings in the connecting component 30. The drive component 20 is linked via the joint configuration 23, 24, 25, 26, 27, 28, through the two fork blades 21, 22, to the connecting component 30 such that it can pivot around the third rotational axis 54.

The play in the tapered roller bearings 27, 28, and thus the play in the joint which pivots around the rotational axis 54, can be adjusted via the screws on the journals 25, 26. To permit the journals 25, 26 to be held in a fixed position, the fork blades 21, 22 are equipped with lengthwise grooves 24*a* that extend from the borings 23, 24 up to the tips of the blades, and these grooves are equipped with borings 29*a*, 29*b* which extend crosswise, all the way through the grooves, into each of which a mounting screw can be inserted.

The output component 40 comprises a first leg piece 41, a second leg piece 42, and a bridge piece 43 which connects the two leg pieces 41, 42. A journal 44, 45 is mounted to each of the leg pieces 41, 42. These journals 44, 45 fit into third tapered roller bearings (not depicted here), to permit mounting of the output component 40 such that it can pivot around the second rotational axis 52. These third tapered roller bearings can function in combination with bearing bushings that are mounted, for example, on the carrier linkage of a vehicle.

An additional journal 31 is fastened with its one side to the bridge piece 43 of the output component 40. Via tapered roller bearings 32, 33 the connecting component 30 is mounted to the journal 31 such that it can rotate around the fourth rotational axis 56. The single-sided mounting of the journal 31 to the output component 40 provides the advantage of ensuring a high degree of freedom of movement of the steering gear 10, in that there is no means of bearing or support at the free (floating) end of the journal 31 which would impede the movement of the steering gear 10.

The journal 31 is equipped with a conical section 34. To enable the axial shifting and fixing of the connecting component 30, which is mounted via the tapered roller bearings 23, 33 to the journal 31, the journal 31 is equipped at its floating end 35 with external screw threads. A nut 36 equipped with internal screw threads can be screwed onto the floating end 35 of the journal, in order to fix the connecting component 30, which is mounted on the journal, in its axial position. With the nut 36, the play in the tapered roller bearings 23, 33, and thus the play in the joint that pivots around the fourth rotational axis 56, c an be adjusted.

As can be seen in FIG. 1, the drive component 20 is positioned in relation to the output component 40 such that the first rotational axis 50 and the second rotational axis 52 form an angle κ of 70 degrees that deviates from zero degrees. In this manner, a ratio of transmission dφ/dψ (ratio between the angle of rotation dφ of the drive component 20 and the angle of rotation dψ of the output component 40), which varies as a function of the angle position φ (angle of rotation of the drive component 20 around the first rotational axis 50), is generated, wherein ψ denotes the angle position of the output component 40 (angle of rotation of the output component 40 around the second rotational axis 52).

If the individual components of the steering mechanism were positioned relative to one another such that both the angle formed between the first and the third rotational axes and the angle formed between the second and the fourth rotational axes were to measure basically 90 degrees, the ratio of transmission between the rotation of the drive component and the corresponding rotation of the output component would vary in a manner that is similar to a traditional universal transmission (based upon the traditional universal joint).

In the embodiment illustrated in FIGS. 1 through 3, however, an angle λ of 75 degrees is formed between the second rotational axis 52 and the fourth rotational axis 56. The angle μ between the first rotational axis 50 and the third rotational axis 54 measures 90 degrees, the result of which is that in the operation of the steering gear 10 over the entire usable steering range, the angle formed between the first rotational axis 50 and the fourth rotational axis 56 has a minimum value of ν when the fourth rotational axis 56 lies within the plane formed between the first rotational axis 50 and the second rotational axis 52. At the same time, the transmission ratio dφ/dψ, described below, also reaches its maximum. In addition, in this case a simple relationship exists between the angle κ formed between the first rotational axis 50 and the second rotational axis 52, the angle λ formed between the second rotational axis 52 and the fourth rotational axis 56, and the minimum value ν of the angle formed between the first rotational axis 50 and the fourth rotational axis 56:

$$\nu = \lambda - \kappa$$

The steering gear illustrated in FIGS. 1 through 3 is installed in a steering mechanism in accordance with the invention such that the angle κ formed between the first rotational axis 50 and the second rotational axis 52 measures approximately 70 degrees. The kinematics 92 (that is, the dependence of the angle position ψ of the output component 40 on the angle position φ of the drive component 20) and the ratio of transmission dφ/dψ 94 (ratio between the rotational angle increment dφ of the drive component and the rotational angle increment dψ of the output component) of the steering gear 10 are shown as diagrams 92, 94 in FIG. 6.

As can be seen in FIG. 6, the transmission ratio dφ/dψ 94 decreases from the zero position of the drive component angle φ (corresponds to a neutral position of the steering mechanism for straight-ahead driving) both with a rotation of the drive component 20 to the right (increasing drive component angle φ) and with a rotation of the drive component 20 to the left (decreasing drive component angle φ). This means that the steering mechanism has a progressive characteristic curve. In addition, with the steering gear 10 illustrated in FIGS. 1 through 3, the transmission ratio dφ/dψ 94 decreases from a maximum value of 11 for φ at its zero position to a minimum value of 0.37 when it reaches the steering stop of the steering gear 10. The steering stop of the steering gear 10 is reached when the drive component 20 is rotated to either the right or the left, around an angle of rotation dφ of approximately 104 degrees from its zero position. In this, the output component 40 is rotated around an angle of rotation dψ of 90 degrees from its zero position. The entire usable angle of rotation range from −104 degrees to +104 degrees is a result of the positioning of the connecting component 30 on the output component, such that the angle λ between the second rotational axis 52 and the fourth rotational axis 56 deviates from 90 degrees.

In the exemplary embodiment of the invention illustrated in FIGS. 1 through 3 (that is, λ=5 degrees, κ=70 degrees, λ=75 degrees, μ=90 degrees), for the kinematics (that is, the dependence of the angle position ψ of the output component 40 on the angle position φ of the drive component 20) the following equation generally applies:

$$\psi(\varphi) = 2\tan^{-1}\left(\frac{\cos(\varphi)^*\sin(\lambda) - \sqrt{\cos^2(\varphi)^*\sin^2(\lambda) + \sin^2(\varphi)^*\cos^2(\kappa)^*\sin^2(\lambda) - \sin^2(\varphi)^*\sin^2(\kappa)^*\cos^2(\lambda)}}{-\sin(\varphi)^*\cos(\kappa)^*\sin(\lambda) - \sin(\varphi)^*\sin(\kappa)^*\cos(\lambda)}\right)$$

In FIG. 4, a preferred embodiment of the steering mechanism specified in the invention, equipped with a device designed to provide power-assistance to the steering mechanism, is schematically illustrated.

A steering wheel 70 is mounted on a steering wheel shaft 73 such that it cannot rotate, and this shaft is mounted inside a steering wheel mount 72 such that it can rotate. In order to limit the rotational movement of the steering wheel, the steering mechanism is equipped with rotational angle limit stops 74. As can be seen in FIG. 5, the rotational angle limit stops 74 comprise a cam 78 that is firmly mounted to the steering wheel shaft 73, and operates in conjunction with a cam stop 76, that is firmly mounted to the wheel mount 72 to limit the rotational movement of the steering wheel 70 to the right and to the left.

The steering wheel shaft 73 is coupled to the steering gear 10 via universal joints 80, 82, a so-called crash-absorber 84, and a hydraulic rotary valve 85; the steering gear 10 controls a steering linkage via a steering tie rod 81, in order to steer the turnable wheels of a vehicle. Via the hydraulic rotary valve 85, a power-assistance device is controlled, which is comprised basically of a pressure relief valve 86, a hydraulic tank 87, a hydraulic pump 88, and a working cylinder 89. The hydraulic rotary valve 85 is positioned on the drive side of the steering gear 10 and the working cylinder 89 is positioned on the output side of the steering gear 10. With this configuration, when combined with the rotational angle limit stops 74, the risk of an overload of the power-assistance system, such as frequently exists for traditional power steering mechanisms, particularly in the maneuvering of the vehicle during parking, is prevented.

In FIG. 7 a steering gear 110 in accordance with a second preferred embodiment of the invention is illustrated, in a simplified, partially sectional side view, similar to the illustration in FIG. 1. In FIG. 8, the steering gear 110 illustrated in FIG. 7 is shown in a cross-section along the bended line C—C (that is, through the first rotational axis 150 and the fourth rotational axis 156), similar to the illustration in FIG. 2. The steering gear illustrated in FIGS. 7 and 8 represents an embodiment of a steering gear as specified in the invention which is particularly simple and compact.

The steering gear 110 shown in FIGS. 7 and 8 comprises a drive component 120 which rotates around a first rotational axis 150 and which is coupled to an output component 140, which rotates around a second rotational axis 152, via a connecting component 130. The drive component 120 is linked to the connecting component 130 such that the drive component can pivot around a third rotational axis 154. The connecting component 130 is then connected to the output component 140 such that the connecting component 130 can pivot around a fourth rotational axis 156.

The end of the oblong drive component 120 which faces the joint component comprises two flat outer surfaces, from each of which a journal 125, 126 protrudes. The end of the oblong drive component 120 that faces the joint component is positioned between two plate-shaped extensions 121, 122 of the connecting component 130. The journals 125, 126 are inserted into corresponding bearings 132, 133, which are positioned in corresponding borings in the plate-shaped extensions 121, 122 of the connecting component 130, for the purpose of linking the drive component 120 to the connecting component 130 such that it can pivot around the third rotational axis 154.

The end of the connecting component 130 which faces away from the plate-shaped extensions 121, 122 is equipped with a protruding journal 131, which is inserted into bearings 132, 133, which are positioned in corresponding bearing bushings in the output component 140. In this manner, the connecting component 130 is linked to the output component 140 such that the connecting component can pivot around the fourth rotational axis 156.

The output component 140 is designed to be angular in shape, and comprises a first leg piece 141 and a second leg piece 143. In the second leg piece 143, the above-mentioned bearing bushings and bearings 132, 133 are positioned, which function in combination with the journal 131 of the connecting component 130. On the first leg piece 141 of the output component 140 a journal 145 is positioned. This journal 145 fits into bearings (not depicted here) designed to mount the output component 140 such that it can rotate around the second rotational axis 152, wherein these bearings can be mounted in corresponding bearing bushings on the chassis of a vehicle that is to be steered via the steering gear 110. The first leg piece 141 is equipped with an extension piece 146 that extends from the angle junction with the second leg piece 143 beyond the second rotational axis 152, and that serves to operate the steering tie rod of the steering mechanism that includes the steering gear 110.

As can be seen in FIG. 7, the drive component 120 is positioned in relation to the output component 140 such that the first rotational axis 150 forms an angle κ of ca. 30 degrees with the second rotational axis 152. An angle λ of ca. 60 degrees is formed between the second rotational axis 152 and the fourth rotational axis 156. The angle μ between the first rotational axis 150 and the third rotational axis 154 measures 90 degrees. Thus the angle formed between the first rotational axis 150 and the fourth rotational axis 156 has a minimum value of approximately 30 degrees.

In FIG. 9, a steering gear 210 in accordance with a third preferred embodiment of the invention is shown in a simplified, partially sectional side view, similar to the illustrations shown in FIGS. 1 and 7. The steering gear 210 shown in FIG. 9 a selectively is characterized by an adjustable angle λ between the second rotational axis 252 and the fourth rotational axis 256, and thus a selectively adjustable transmission ratio.

The steering gear 210 illustrated in FIG. 9 comprises—similar to the steering gear 10 illustrated in FIGS. 1 through 3—a drive component 220 which rotates around a first rotational axis 250, and which is coupled via a connecting component 230 to an output component 240 which rotates around a second rotational axis 252. The drive component 220 is connected to the connecting component 230 such that the drive component can pivot around a third rotational axis 254. The connecting component 230 is connected to the output component 240 such that the connecting component can pivot around a fourth rotational axis 256.

The end of the oblong drive component 220 which faces the joint component is equipped with two fork blades. Each of the two fork blades is equipped with a boring and with bearings, into which two journals 226 of the connecting component 230, which is positioned largely between the two fork blades, are inserted, in order to connect the drive component 220 to the connecting component 230 such that the drive component can pivot around the third rotational axis 254.

The output component 240 comprises a first leg piece 241, a second leg piece 242, and a bridge piece 243 which connects the two leg pieces 241, 242 and which in the side view shown in FIG. 9 is basically in the shape of a semicircle. On each of the two leg pieces 241, 242, a journal 244, 245 is positioned. These journals 244, 245 fit into bearings 246, 247 in order to support the output component 240 such that it can rotate around the second rotational axis 252, wherein these bearings 246, 247 can be mounted in corresponding bearing bushings on the chassis of a vehicle that is to be steered via the steering gear 210. The first leg piece 241 is provided with an extension 246 which extends from the bridge piece 243 beyond the second rotational axis 252, and serves to operate the steering linkage of the steering mechanism that includes the steering gear 210.

The bridge piece 243 is formed by a basically semicircular wall 243, with the wall 243 being positioned such that the cylindrical axis extends through the intersection of the four rotational axes 250, 252, 254, 256. In the cylindrical wall a groove is formed, extending along the circumference of the wall, such that the surface that is defined by the arc-shaped groove extends through the intersection of the four rotational axes 250, 252, 254, 256. In the groove, a journal 231 is fastened via a mounting flange 239 such that it can be held and released as desired, and such that it also extends through the intersection of the four rotational axes 250, 252, 254, 256. In this manner, the journal 231, which is always positioned radially in relation to the cylindrical wall 243, can be moved to any position along the length of the groove in the cylindrical wall 243, with the fourth rotational axis 256 defined by the journal 231 always extending through the common point of intersection of the four rotational axes 250, 252, 254, 256. In this manner, selective adjustment of the angle λ between the second rotational axis 252 and the fourth rotational axis 256, and thereby of the transmission ratio of the steering mechanism 210, is enabled.

Via tapered roller bearings 232, 233, the connecting component 230, which is equipped with a central boring corresponding to the journal 231, is mounted to the journal 231 such that it rotates around the fourth rotational axis 256.

In FIG. 10, a steering gear 310 in accordance with a fourth preferred embodiment of the invention is illustrated in a simplified, partially sectional side view similar to the illustrations shown in FIGS. 1 and 9. The steering gear 310 shown in FIG. 10 is characterized by a mounting [positioning] of the oblong drive component 320 on both outer sides of the connecting component 330.

The steering gear 310 illustrated in FIG. 10—as with the steering gear 10 illustrated in FIGS. 1 through 3—comprises a drive component 320 that rotates around a first rotational axis 350, and is coupled via an connecting component 330 to an output component 340 that rotates around a second rotational axis 352. The drive component 320 is connected to the connecting component 330 such that the drive component can pivot around a third rotational axis 354. The connecting component 330 is connected to the output component 340 such that the output component can pivot around a fourth rotational axis 356.

In the area around the connecting component 330, the drive component 320 is arc-shaped, with the connecting component 330 being positioned within the space enclosed by the arc-shaped section of the drive component 320. On both sides of the connecting component, the drive component 320 is mounted in bearings 328, 329 such that it can rotate around the first rotational axis 350. The bearing bushings of the bearings 328, 329 are mounted in corresponding bearing shells in a component 390 of the chassis of a vehicle that is to be steered via the steering gear 310.

The arc-shaped section of the oblong drive component 320 is equipped with two lobe-shaped extensions 321. Each of the two lobes 321 is equipped with a boring and bearings into which two journals 326 of the connecting component 330, which is positioned basically between the two lobes, are inserted, in order to connect the drive component 320 to the connecting component 330 such that the drive component can pivot around the third rotational axis 354.

The output component 340 is angular in design, and comprises a first leg piece 341 and a second leg piece 343. A journal 331 is formed on the second leg piece 343. Via tapered roller bearings 332, 333, the connecting component 330, which is equipped with a central boring that corresponds to the journal 331, is mounted to the journal 331 such that the connecting component can rotate around the fourth rotational axis, which is defined by the journal 331.

A journal 345 is positioned on the first leg piece 341 of the output component 340. This journal 345 fits into bearings 347, 348 designed to mount the output component 340 such that it can rotate around the second rotational axis 352, and these bearings 347, 348 are mounted in corresponding bearing bushings in a component 390 of the chassis of the vehicle that is to be controlled via the steering gear 310. The first leg piece 341 extends from the point of connection with the second leg piece 343 beyond the second rotational axis 352, in order to operate the steering linkage of the steering mechanism which includes the steering gear 110.

In summary, the invention provides a vehicle steering mechanism having a variable transmission ratio, and a steering gear for such a steering mechanism, wherein the steering gear is comprised basically of a drive component, a connecting component, and an output component, and of joint components which permit the drive component to be connected to the connecting component such that the drive component can pivot, and the connecting component to the output component such that the connecting component also can pivot. The steering gear specified in the invention thus is highly simple in its construction. Using the proper joint components, the steering gear specified in the invention can be adjusted over the entire steering range basically without play, and it will permit a transmission ratio that is sufficient for vehicle steering mechanisms.

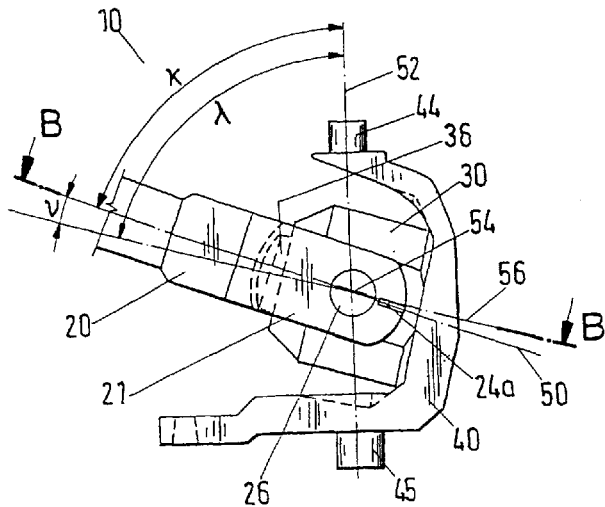

What is claimed is:

1. Vehicle steering mechanism with a variable transmission ratio, having a steering gear (10; 110; 210; 310) comprised of a drive component (20; 120; 220; 320) which rotates around a first rotational axis (50; 150; 250; 350) and which is coupled via a connecting component (30; 130; 230; 330) to an output component (40; 140; 240; 340) which rotates around a second rotational axis (52; 152; 252; 352), wherein the drive component (20; 120; 220; 320) is connected to the connecting component (30; 130; 230; 330) such that the drive component can pivot around a third rotational axis (54; 154; 254; 354), and the connecting component is connected to the output component (40; 140; 240; 340) such that the connecting component can pivot around a fourth rotational axis (56; 156; 256; 356), characterized by a positioning of the four rotational axes such that the four rotational axes intersect at a single point, and the minimum angle (ν) formed between the first rotational axis (50; 150; 250; 350) and the fourth rotational axis (56; 156; 256; 356) ranges from 0.1 degree to 40 degrees.

2. Vehicle steering mechanism in accordance with claim 1, characterized in that the drive component (20; 320) is positioned in relation to the output component (40; 340) such that the angle (κ) formed between the first rotational axis (50; 350) and the second rotational axis (52; 352) ranges from 50 degrees to 89.9 degrees.

3. Vehicle steering mechanism in accordance with claims 1, characterized in that it further comprises a steering wheel (70) for operation of the steering mechanism, which is equipped with rotational angle limit stops (74, 76, 78) designed to limit the rotational movement of the steering wheel (70).

4. Steering gear (10; 110; 210; 310) for a vehicle steering mechanism in accordance with claim 1, comprising a drive component (20; 120; 220; 320) which rotates around a first rotational axis (50; 150; 250; 350), and which is coupled via a connecting component (30; 130; 230; 330) to an output component (40; 140; 240; 340) which rotates around a second rotational axis (52; 152; 252; 352), wherein the drive component (20; 120; 220; 320) is linked to the connecting component (30; 130; 230; 330) such that the drive component can pivot around a third rotational axis (54; 154; 254; 354), and the connecting component is connected to the output component (40; 140; 240; 340) such that the connecting component can pivot around a fourth rotational axis (56; 156; 256; 356), characterized in that the four rotational axes are positioned such that the four rotational axes intersect at a single point and the minimum angle (ν) formed between the first rotational axis (50; 150; 250; 350) and the fourth rotational axis (56; 156; 256; 356) ranges from 0.1 degree to 40 degrees.

5. Steering gear (10; 110; 210; 310) in accordance with claim 4, characterized in that the connecting component (30; 130; 230; 330) is positioned in relation to the output component (40; 140; 240; 340) such that the fourth rotational axis (56; 156; 256; 356) forms an angle (λ) with the second rotational axis (52; 152; 252; 352) which ranges from 25 degrees to 85 degrees.

6. Steering gear (210) in accordance with claim 4, characterized by a means (239, 243) for adjusting the angle (λ) formed between the fourth rotational axis (256) and the second rotational axis (252).

7. Steering gear (10) in accordance with claim 4, characterized in that the drive component (20) comprises a bifurcated component having two fork blades (21, 22), and in that each of the two fork blades (21, 22) is equipped with first joint components (23, 24, 25, 26, 27, 28) designed for connecting the fork blades (21, 22) to the connecting component (30) such that they can pivot.

8. Steering gear (10) in accordance with claim 4, characterized in that, in order to link the connecting component (30) to the output component (40) such that the connecting component can pivot, a spindle (31) is mounted on one side of one of a pair of components comprising the connecting component (30) and the output component (40), while the other of the pair of components is mounted to the spindle (31) via bearings (32, 33) such that it can rotate.

9. Steering gear (10) in accordance with claim 8, characterized in that the journal (31) is equipped with a conical section (34), the bearings (32, 33) comprise one or more tapered roller bearings (32, 33), and the component which is mounted to the journal (31) can be held in its axial position by means of mounting elements (36) which can be shifted axially, with the play in the bearings (32, 33) being adjusted by an axial shifting of the mounting elements (36).

10. Steering gear (10) in accordance with claim 8, characterized in that the output component (40) comprises a first leg piece (41), a second leg piece (42), and a bridge piece (43) which connects the two leg pieces (41, 42), wherein the journal (31) is mounted firmly with its one side to the bridge piece (43), and each of the two leg pieces (41, 42) is equipped with third joint components (44, 45) for the mounting of the output component (40) such that it can rotate around the second rotational axis (52).

11. Vehicle steering mechanism in accordance with claim 2, characterized in that it further comprises a steering wheel (70) for operation of the steering mechanism, which is equipped with rotational angle limit stops (74, 76, 78) designed to limit the rotational movement of the steering wheel (70).

12. Steering gear (10; 110; 210; 310) for a vehicle steering mechanism in accordance with claim 2, comprising a drive component (20; 120; 220; 320) which rotates around a first rotational axis (50; 150; 250; 350), and which is coupled via a connecting component (30; 130; 230; 330) to an output component (40; 140; 240; 340) which rotates around a second rotational axis (52; 152; 252; 352), wherein the drive component (20; 120; 220; 320) is linked to the connecting component (30; 130; 230; 330) such that drive component can pivot around a third rotational axis (54; 154; 254; 354), and the connecting component to the output component (40; 140; 240; 340) such that the connecting component can pivot around fourth rotational axis (56; 156; 256; 356), characterized in that the four rotational axes are positioned such that the four rotational axes intersect at a single point and the minimum angle (ν) formed between the first rotational axis (50; 150; 250; 350) and the fourth rotational axis (56; 156; 256; 356) ranges from 0.1 degree to 40 degrees.

13. Steering gear (10; 110; 210; 310) for a vehicle steering mechanism in accordance with claim 3, comprising a drive component (20; 120; 220; 320) which rotates around a first rotational axis (50; 150; 250; 350), and which is coupled via connecting component (30; 130; 230; 330) to an output component (40; 140; 240; 340) which rotates around a second rotational axis (52; 152; 252; 352), wherein the drive component (20; 120; 220; 320) is linked to the connecting component (30; 130; 230; 330) such that drive component can pivot around a third rotational axis (54; 154; 254; 354), and the connecting component in connected to the output component (40; 140; 240; 340) such that the connecting component can pivot around a fourth rotational axis (56; 156; 256; 356), characterized in that the four rotational axes are positioned such that the four rotational axes intersect at a single point and the minimum angle (ν) formed between the first rotational axis (50; 150; 250; 350) and the fourth rotational axis (56; 156; 256; 356) ranges from 0.1 degree to 40 degrees.

14. Steering gear (210) in accordance with claim 5, characterized by a means (239,243) for adjusting the angle (λ) formed between the fourth rotational axis (256) and the second rotational axis (252).

15. Steering gear (10) in accordance with claim 5, characterized in that the drive component (20) comprises a bifurcated component having two fork blades (21, 22), and in that each of the two fork blades (21, 22) is equipped with first joint components (23, 24, 25, 26, 27, 28) designed for connecting the fork blades (21, 22) to the connecting component (30) such that they can pivot.

16. Steering gear (10) in accordance with claim 6, characterized in that the drive component (20) comprises a bifurcated component having two fork blades (21, 22), and in that each of the two fork blades (21, 22) is equipped with first joint components (23, 24, 25, 26, 27, 28) designed for connecting the fork blades (21, 22) to the connecting component (30) such that they can pivot.

17. Steering gear (10) in accordance with claim 5, characterized in that, in order to link the connecting component (30) to the output component (40) such that the connecting component can pivot, a journal (31) is mounted with its one side on one of a pair of components comprising the connecting component (30) and the output component (40), while the other of the pair of components is mounted to the journal (31) via bearings (32, 33) such that it can rotate.

18. Steering gear (10) in accordance with claim 6, characterized in that, in order to link the connecting component (30) to the output component (40) such that the connecting component can pivot, a journal (31) is mounted with its one side on one of a pair of components comprising the connecting component (30) and the output component (40), while the other of the pair of components is mounted to the journal (31) via bearings (32, 33) such that it can rotate.

19. Steering gear (10) in accordance with claim 7, characterized in that, in order to link the connecting component (30) to the output component (40) such that the connecting component can pivot, a journal (31) is mounted with its one side on one of a pair of components comprising the connecting component (30) and the output component (40), while the other of the pair of components is mounted to the journal (31) via bearings (32, 33) such that it can rotate.

20. Steering gear (10) in accordance with claim 9, characterized in that the output component (40) comprises a first leg piece (41), a second leg piece (42), and a bridge piece (43) which connects the two leg pieces (41, 42), wherein the journal (31) is mounted firmly with its one side to the bridge piece (43), and each of the two leg pieces (41, 42) is equipped with third joint components (44, 45) for the mounting of the output component (40) such that it can rotate around the second rotational axis (52).

21. A steering gear having a variable transmission ratio, comprising:
   a driving component rotatable about a first axis;
   a connecting component rotatable about a fourth axis, said driving component being pivotably connected to said connecting component about a third axis generally orthogonal to said first axis; and
   an output component rotatable about a second axis, said connecting component being rotatably mounted on said output component about said fourth axis,
   wherein said first axis and said fourth axis are skewed relative to each other.

22. The gear according to claim 21, wherein said first and fourth axes have a minimum angle of between 0.1° and 40° therebetween.

* * * * *

UNITED STATES PATENT AND TRADEMARK OFFICE
CERTIFICATE OF CORRECTION

PATENT NO.    : 6,203,038 B1
DATED         : March 20, 2001
INVENTOR(S)   : Bernhard, Ernst It is certified that error appears in the above-identified patent and that said Letters Patent is hereby corrected as shown below:

Title page,
The Title page showing an illustrative figure should be deleted and substitute therefore the attached title page.

Drawings,
Sheet 1 of 9, consisting Fig. 1, should be deleted and substitute therefor the corrected Fig. 1, as shown on the attached page. Sheet 10 of 10, consisting of Fig. 10, should be deleted and substitute therefore the corrected Fig. 10, as shown on attached page.

Signed and Sealed this

Eighteenth Day of June, 2002

*Attest:*

JAMES E. ROGAN
*Director of the United States Patent and Trademark Office*

*Attesting Officer*

United States Patent
Bernhard

(10) Patent No.: US 6,203,038 B1
(45) Date of Patent: Mar. 20, 2001

(54) VEHICLE STEERING MECHANISM

(75) Inventor: Ernst Bernhard, Aegerten (CH)

(73) Assignee: Wandfluh Automotive AG, Kandergrund (CH)

(*) Notice: Subject to any disclaimer, the term of this patent is extended or adjusted under 35 U.S.C. 154(b) by 0 days.

(21) Appl. No.: 09/186,627

(22) Filed: Nov. 6, 1998

(30) Foreign Application Priority Data

Nov. 7, 1997 (EP) ........................................... 97810839

(51) Int. Cl.[7] .................................................. B62D 7/09
(52) U.S. Cl. ........................... 280/93.502; 280/93.511; 74/496
(58) Field of Search .................. 280/93.512, 89.1, 280/771, 124.125, 89.11, 90, 124.134, 93.502, 93.51, 93.511; 172/15; 180/400, 414, 415, 58, 446; 414/686; 477/86; 74/496

(56) References Cited

U.S. PATENT DOCUMENTS

| | | | |
|---|---|---|---|
| 1,782,361 | * 11/1930 | Matschei . | |
| 2,428,651 | * 10/1947 | Buese | 280/96.1 |
| 2,862,723 | * 12/1958 | Peras | 280/96.1 |
| 4,635,952 | * 1/1987 | Smith | 280/96.1 |
| 4,690,418 | * 9/1987 | Smith | 280/96.1 |
| 4,899,611 | * 2/1990 | Pinna | 74/492 |
| 4,921,470 | * 5/1990 | Kotani et al. | 464/151 |
| 4,938,094 | * 7/1990 | Cochard | 74/552 |
| 5,080,520 | * 1/1992 | Wood, Jr. | 403/77 |
| 5,340,137 | * 8/1994 | Carraro et al. | 280/96.1 |
| 5,358,445 | * 10/1994 | Wuebker | 464/112 |
| 5,503,239 | 4/1996 | Shimizu | 180/79 |
| 5,687,811 | * 11/1997 | Shimizu | 180/447 |
| 5,709,399 | * 1/1998 | Smith, Jr. | 280/96.1 |
| 5,722,784 | * 3/1998 | Link | 403/158 |
| 5,836,211 | * 11/1998 | Ross et al. | 74/493 |
| 5,930,908 | * 8/1999 | Patrisso et al. | 33/600 |
| 6,062,762 | * 5/2000 | Lustig | 403/270 |

FOREIGN PATENT DOCUMENTS

| | | |
|---|---|---|
| 195 19 588 | 4/1996 | (DE) . |
| 0008305 | 3/1980 | (EP) . |
| 0737612 | 10/1996 | (EP) . |

* cited by examiner

Primary Examiner—J. J. Swann
Assistant Examiner—J. Allen Shriver

(57) ABSTRACT

The present invention relates to a vehicle steering mechanism having a variable transmission ratio, and a steering gear designed for such a steering mechanism.

22 Claims, 9 Drawing Sheets

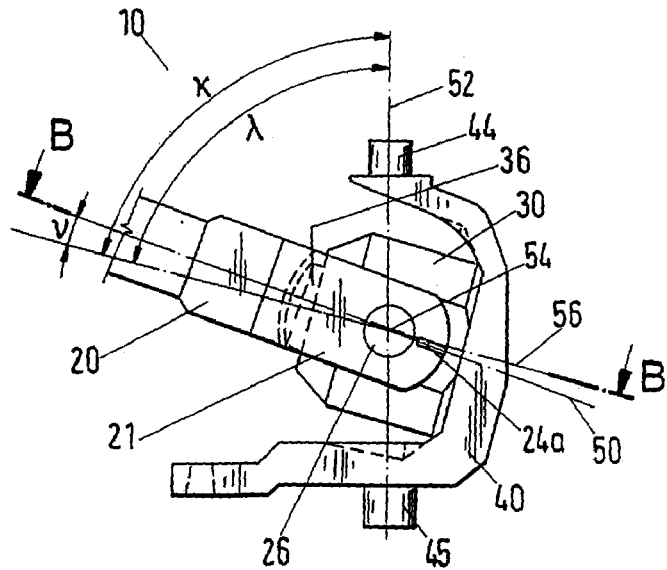

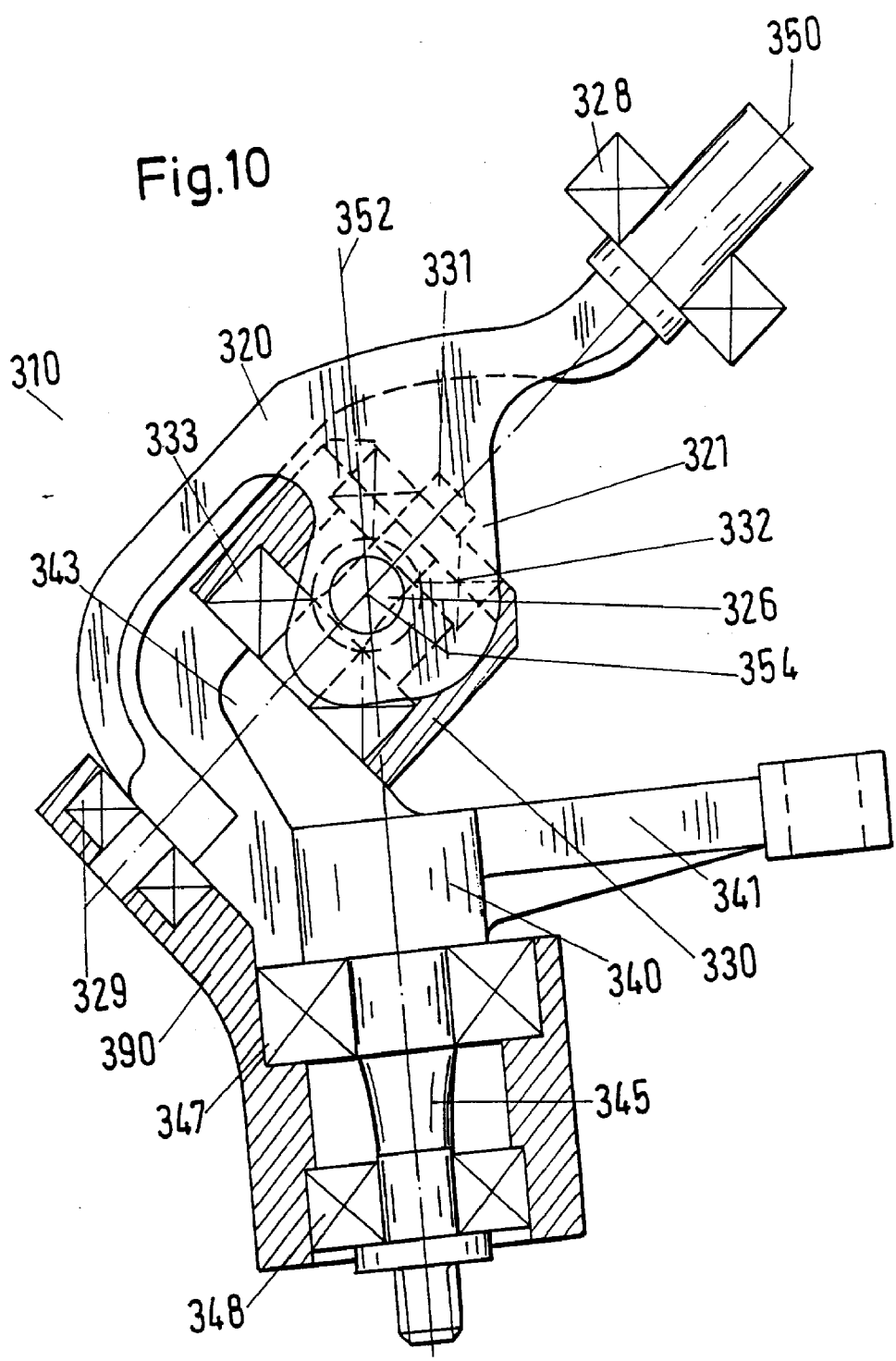

UNITED STATES PATENT AND TRADEMARK OFFICE
CERTIFICATE OF CORRECTION

PATENT NO.   : 6,203,038 B1
DATED        : March 20, 2001
INVENTOR(S)  : Bernhard, Ernst It is certified that error appears in the above-identified patent and that said Letters Patent is hereby corrected as shown below:

Title page,
The Title page showing an illustrative figure should be deleted and substitute therefor the attached title page.

Drawings,
Sheets 1 of 9 and 9 of 9, consisting of Figs. 1 and 10, should be deleted and substitute therefor the attached corrected pages.

This certificate supersedes Certificate of Correction issued June 18, 2002.

Signed and Sealed this

Twelfth Day of October, 2004

JON W. DUDAS
*Director of the United States Patent and Trademark Office*

(12) United States Patent
Bernhard

(10) Patent No.: US 6,203,038 B1
(45) Date of Patent: Mar. 20, 2001

(54) VEHICLE STEERING MECHANISM

(75) Inventor: Ernst Bernhard, Aegerten (CH)

(73) Assignee: Wandfluh Automotive AG, Kandergrund (CH)

( * ) Notice: Subject to any disclaimer, the term of this patent is extended or adjusted under 35 U.S.C. 154(b) by 0 days.

(21) Appl. No.: 09/186,627

(22) Filed: Nov. 6, 1998

(30) Foreign Application Priority Data

Nov. 7, 1997 (EP) .................................. 97810839

(51) Int. Cl.$^7$ ............................................ B62D 7/09
(52) U.S. Cl. ...................... 280/93.502; 280/93.511; 74/496
(58) Field of Search .................. 280/93.512, 89.1, 280/771, 124.125, 89.11, 90, 124.134, 93.502, 93.51, 93.511; 172/15; 180/400, 414, 415, 58, 446; 414/686; 477/86; 74/496

(56) References Cited

U.S. PATENT DOCUMENTS

| | | | | |
|---|---|---|---|---|
| 1,782,361 | * | 11/1930 | Matschei . | |
| 2,428,651 | * | 10/1947 | Buese | 280/96.1 |
| 2,862,723 | * | 12/1958 | Peras | 280/96.1 |
| 4,635,952 | * | 1/1987 | Smith | 280/96.1 |
| 4,690,418 | * | 9/1987 | Smith | 280/96.1 |
| 4,899,611 | * | 2/1990 | Pinna | 74/492 |
| 4,921,470 | * | 5/1990 | Kotani et al. | 464/151 |
| 4,938,094 | * | 7/1990 | Cochard | 74/552 |
| 5,080,520 | * | 1/1992 | Wood, Jr. | 403/77 |
| 5,340,137 | * | 8/1994 | Carraro et al. | 280/96.1 |
| 5,358,445 | * | 10/1994 | Wuebker | 464/112 |
| 5,503,239 | | 4/1996 | Shimizu | 180/79 |
| 5,687,811 | * | 11/1997 | Shimizu | 180/447 |
| 5,709,399 | * | 1/1998 | Smith, Jr. | 280/96.1 |
| 5,722,784 | * | 3/1998 | Link | 403/158 |
| 5,836,211 | * | 11/1998 | Ross et al. | 74/493 |
| 5,930,908 | * | 8/1999 | Patrisso et al. | 33/600 |
| 6,062,762 | * | 5/2000 | Lustig | 403/270 |

FOREIGN PATENT DOCUMENTS

| | | |
|---|---|---|
| 195 19 588 | 4/1996 | (DE) . |
| 0008305 | 3/1980 | (EP) . |
| 0737612 | 10/1996 | (EP) . |

* cited by examiner

Primary Examiner—J. J. Swann
Assistant Examiner—J. Allen Shriver

(57) ABSTRACT

The present invention relates to a vehicle steering mechanism having a variable transmission ratio, and a steering gear designed for such a steering mechanism.

22 Claims, 10 Drawing Sheets

Fig.1